April 16, 1963 V. L. SALVATORI 3,086,166

CUBIC FUNCTION GENERATOR

Filed Jan. 8, 1959

INVENTOR
VINCENT L. SALVATORI
BY
Mitchell & Bechert
ATTORNEY

United States Patent Office 3,086,166

Patented Apr. 16, 1963

3,086,166

CUBIC FUNCTION GENERATOR

Vincent L. Salvatori, State College, Pa., assignor, by mesne assignments, to HRB-Singer, Inc., State College, Pa., a corporation of Delaware Filed Jan. 8, 1959, Ser. No. 785,644
1 Claim. (Cl. 323—79)

This invention relates to a novel cubic function generator.

In computer applications, and particularly analog computer applications, there is a need for cubic function generators. It is, of course, fundamental that a cubic device exhibit cubic transfer characteristics. Heretofore, cubing had been accomplished by first squaring the function to be cubed, and then multiplying the original function by the squared quantity. This, obviously, is a crude way of cubing. In addition, this technique is encumbered by relatively complicated circuitry, with inherent errors, which are concomitant with such circuitry.

Another important application of the cubic generator is as a cubic mixer. Cubic mixing occurs when two signals, for example, a modulated frequency signal and a local oscillator signal, are mixed, with the result that the modulations are transferred from the radio frequency waves to the local oscillator waves. This type of mixing has the advantage of permitting frequency selection to be effected prior to mixing, so that the local oscillator need not be tuned. A communication system disclosing this type of mixing is disclosed and claimed in the copending application of Rufus R. C. Benton for Cross-Modulation Detector, Serial No. 793,910, filed February 17, 1959.

Accordingly, it is a primary object of this invention to provide a simple cubic function generator, comprising relatively few parts, and which is practically errorless.

It is a further object of the invention to provide a cubic function generator which has cubic transfer characteristics and is, therefore, capable of cubing a function directly.

It is a feature of this invention to provide a cubic function generator which has particular utility in computers, and in communication systems where cubic mixing is desirable.

In accordance with an aspect of this invention, there is provided a cubic function generator comprising a pair of electronic devices having similar current-voltage characteristic curves extending in the first and third quadrants. The curve in the first quadrant resembles generally a cubic curve but has a slope less steep than the cubic curve; the curve in the third quadrant being relatively flat and of small amplitude. The fnuction generator is characterized by connecting the electronic devices in shunt and in reverse polarity, so that the cubic resembling portions of the characteristic curves lie in the first and third quadrants. The relatively flat portions of the respective curves add to the other portions, whereby the combined characteristic constitutes a cubic function.

The above-mentioned and other features and objects of this invention, and the manner of attaining them, will become more apparent and the invention itself will be best understood by reference to the following description of an embodiment of the invention taken in conjunction with the accompanying drawing, wherein.

Figure 1:
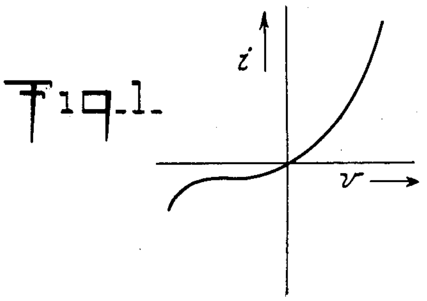
FIGURE 1 is a characteristic curve of a semi-conductor circuit element useful in this invention.

Certain semiconductor materials, when embodied in electronic circuit elements, such as diodes or transistors, exhibit voltage-current characteristic curves which extend in the first and third quadrants of a Cartesian coordinate system. A typical germanium or silicon semiconductor diode characteristic curve is illustrated in FIGURE 1. The parts of the curve in the first and third quadrants are often referred to as the forward and reverse characteristics, respectively. These names have been ascribed to the two parts of the characteristic curve because when current is passed through the diode in the forward conducting direction, the voltage-current characteristic is as illustrated in the first quadrant. Similarly, when the current is applied in the reverse direction, the characteristic is as illustrated in the third quadrant. Obviously, the overall characteristic curve of the diode does not resemble a cubic function. The slope of the curve in the first quadrant, although generally resembling a cubic curve, is not sufficiently steep. The curve in the third quadrant is, obviously, totally different from the cubic function which normally appears in the third quadrant.

In accordance with the invention, a cubic function is realized by connecting in reverse polarity a pair of diodes or transistors, each exhibiting a characteristic such as illustrated in FIGURE 1. By reverse polarity, it is meant that the input electrode of one device is connected to the output electrode of the other device. This is illustrated in FIGURE 2.

Figure 2:
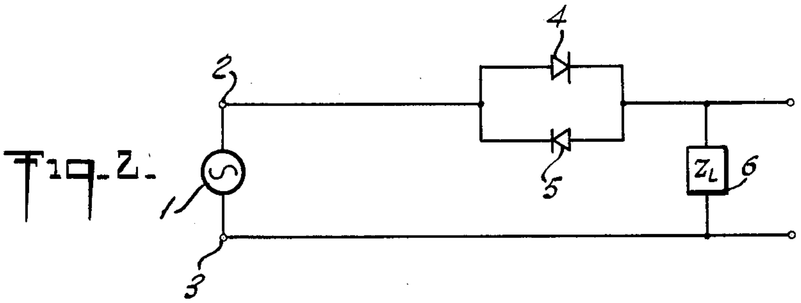
FIGURE 2 is a schematic diagram of a simplified embodiment of the cubic function generator.

Referring now to FIGURE 2, a simplified embodiment of the cubic function generator is illustrated. The cubic function generator comprises a source of electrical energy, shown schematically as a source of alternating current 1, connected to a pair of input terminals 2, 3. A pair of diodes 4, 5, connected in reverse polarity, is connected to one of the input terminals, e.g., terminal 2. A load 6 is connected in series with the pair of diodes 4, 5 and the voltage source 1; the output being taken across the load 6. The load impedance 6 may take any of the basic forms depending on the application of the circuit. In other words, the load impedance may be inductive, capacitive, resistive or any combination of these components.

Figure 3:
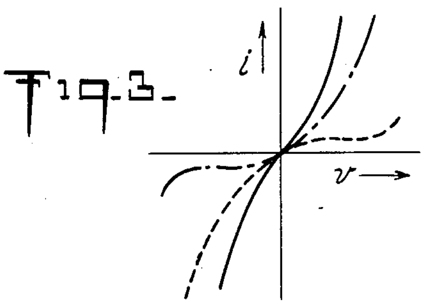
FIGURE 3 are characteristic curves for a pair of semiconductor diodes employed in the cubic generator.

Since the characteristic for each of the diodes is as illustrated in FIGURE 1, the combined characteristics of the diodes connected in reverse polarity are shown in FIGURE 3. It is seen that the slope of the curve in the first quadrant, for the diode connected momentarily in the forward conducting direction, is steepened by the effect of the reverse characteristic of the other diode. Similarly, the forward characteristic in the third quadrant of the other diode is steepened by the effect of the reverse characteristic of the first-mentioned diode. The combined characteristic is a very close approximation to a cubic function. In many instances a simplified embodiment of the cubic function generator may be adequate. However, where greater accuracy is required, the embodiment illustrated in FIGURE 4 is recommended.

Figure 4:
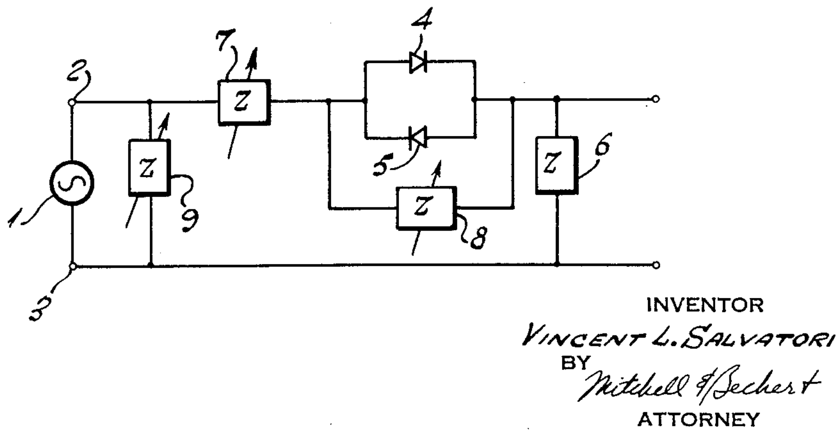
FIGURE 4 is a schematic diagram of a cubic function generator comprising means for varying the steepness of the slopes of the cubic curves.

In FIGURE 4 a variable impedance 7 is added in series with the pair of diodes, which serves adjustably to flatten the slope of the cubic function. That is, the impedance 7 reduces the value of K in the equation $I=KV^3$.

A variable impedance 8, connected across the diodes 4, 5, serves adjustably to steepen the characteristic cubic curve. Another impedance 9, connected across the input terminals 2, 3, is employed for impedance matching purposes.

The impedances 7 and 8 are preferably resistors and perform the desired function as a result of the series or parallel connections they occupy in the circuit. The matching impedance 9 may be reactive or resistive, depending upon the nature of the source 1. If the source is capacitive, the matching impedance 9 should be inductive to neutralize the effect of the source 1.

It is apparent from the above discussion that it is only essential, in the development of the cubic curve, to select an electronic device which has a characteristic which extends in the first and third quadrants, and the third quadrant curve being combinable with the first quadrant curve to form a cubic function. One such device is a diode identified as IN305/CK739.

While the foregoing description sets forth the principles of the invention in connection with specific circuitry and circuit components, it is to be clearly understood that this description is made only by way of example and not as a limitation of the scope of the invention as set forth in the objects thereof and in the accompanying claim.

I claim:

A cubic function generator comprising two nonlinear impedance elements each having similar current-voltage characteristics, the individual current-voltage characteristics of each of said elements being defined by a characteristic curve drawn on a plane, rectangular, current-voltage coordinate system having first, second, third, and fourth quadrants therein, the characteristic curve of each element comprising a relatively steeply sloped portion extending exclusively into said first quadrant and a relatively flat portion extending exclusively into said third quadrant, said steeply sloped portion being generally cubic in shape but less steep in slope and smaller in amplitude than a cubic curve of the same order of magnitude, said flat portion being approximately equal in slope and in amplitude to the difference between said steeply sloped portion and a cubic curve of the same order of magnitude, and said steeply sloped and flat portions being joined together to form a single, continuous characteristic curve representing the current-voltage characteristics of said non-linear impedance element, said two non-linear impedance elements being coupled together in parallel in such polarity as to define a combined current-voltage characteristic curve having a first substantially cubic curve portion extending into the first quadrant of a plane, rectangular, current-voltage coordinate system and a second substantially cubic curve portion extending exclusively into the third quadrant thereof, said first cubic portion being formed by adding the relatively flat characteristic curve portion of one non-linear impedance element to the relatively steeply sloped characteristic curve portion of the other non-linear impedance element, said second cubic curve portion being formed by adding the relatively steeply sloped characteristic curve portion of said one non-linear impedance element to the relatively flat characteristic curve portion of said other non-linear impedance element, said first and second cubic curve portions being joined together to form a single continuous cubic curve representing the overall current-voltage characteristic of said two parallel coupled non-linear impedance elements, an electrical energy source and a linear load impedance element both coupled in series with said two parallel coupled non-linear impedance elements and forming a closed series loop whereby an output signal derived from said load impedance will be a substantially cubic function of electrical energy applied to said impedance elements by electrical energy source, and a variable linear impedance element coupled in series with said linear load impedance and two parallel coupled non-linear impedance elements and a variable linear impedance element coupled in parallel with said two parallel coupled non-linear impedance elements, said variable linear impedance elements adjustably varying the slope of said cubic function.

References Cited in the file of this patent

UNITED STATES PATENTS

| | | |
|---|---|---|
| 1,969,657 | McCaa | Aug. 7, 1934 |
| 1,998,119 | Cox | Apr. 16, 1935 |
| 2,034,826 | Nyquist | Mar. 24, 1936 |
| 2,066,333 | Caruthers | Jan. 5, 1937 |
| 2,086,602 | Caruthers | July 13, 1937 |
| 2,751,555 | Kirkpatrick | June 19, 1956 |